(12) United States Patent
Islam et al.

(10) Patent No.: US 12,490,127 B2
(45) Date of Patent: Dec. 2, 2025

(54) SERVING CELL MEASUREMENT OBJECTS ASSOCIATED WITH ACTIVE BANDWIDTH PARTS

(71) Applicant: QUALCOMM Incorporated, San Diego, CA (US)

(72) Inventors: Muhammad Nazmul Islam, Littleton, MA (US); Linhai He, San Diego, CA (US); Prashant Sharma, San Jose, CA (US); Jing Lei, San Diego, CA (US); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 18/155,369

(22) Filed: Jan. 17, 2023

(65) Prior Publication Data

US 2023/0308914 A1   Sep. 28, 2023

Related U.S. Application Data

(60) Provisional application No. 63/268,180, filed on Feb. 17, 2022.

(51) Int. Cl.
*H04W 24/08* (2009.01)
*H04L 5/00* (2006.01)

(52) U.S. Cl.
CPC ........... *H04W 24/08* (2013.01); *H04L 5/0094* (2013.01)

(58) Field of Classification Search
None
See application file for complete search history.

(56) References Cited

U.S. PATENT DOCUMENTS

| 2020/0383022 | A1* | 12/2020 | Shrestha | H04W 36/0064 |
| 2021/0175985 | A1* | 6/2021 | Yoon | H04W 56/00 |
| 2021/0176656 | A1* | 6/2021 | Sang | H04W 36/302 |
| 2022/0394533 | A1* | 12/2022 | Jin | H04W 56/001 |
| 2023/0171658 | A1* | 6/2023 | Wen | H04L 5/0048 |

FOREIGN PATENT DOCUMENTS

| EP | 3629617 A1 | 4/2020 |
| EP | 4040849 A1 | 8/2022 |
| EP | 4050930 A1 | 8/2022 |
| EP | 4120738 A1 | 1/2023 |
| WO | WO-2019233119 A1 | 12/2019 |
| WO | WO-2021088985 A1 | 5/2021 |
| WO | WO-2021190364 A1 | 9/2021 |
| WO | WO-2021204274 A1 | 10/2021 |

OTHER PUBLICATIONS

International Search Report and Written Opinion—PCT/US2023/060818—ISA/EPO—Apr. 11, 2023.

* cited by examiner

*Primary Examiner* — Saad Khawar
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration that indicates one or more measurement objects, wherein a measurement object of the one or more measurement objects indicates a synchronization signal block (SSB) frequency of a configured bandwidth part (BWP). The UE may determine, from the one or more measurement objects, a serving cell measurement object based at least in part on an active BWP of the UE, wherein the serving cell measurement object is associated with an SSB frequency in the active BWP. Numerous other aspects are described.

29 Claims, 11 Drawing Sheets

910 — Transmit, to a user equipment (UE), a configuration that indicates one or more measurement objects, wherein a measurement object of the one or more measurement objects indicates a synchronization signal block (SSB) frequency in a configured bandwidth part (BWP), and wherein a serving cell measurement object from the one or more measurement objects is based at least in part on an active BWP of the UE

FIG. 9

SERVING CELL MEASUREMENT OBJECTS ASSOCIATED WITH ACTIVE BANDWIDTH PARTS

CROSS-REFERENCE TO RELATED APPLICATION

This Patent Applications claims priority to U.S. Provisional Patent Application No. 63/268,180, filed on Feb. 17, 2022, entitled "SERVING CELL MEASUREMENT OBJECTS ASSOCIATED WITH ACTIVE BANDWIDTH PARTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for serving cell measurement objects associated with active bandwidth parts (BWPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity, a configuration that indicates one or more measurement objects, wherein a measurement object of the one or more measurement objects indicates a synchronization signal block (SSB) frequency of a configured bandwidth part (BWP); and determine, from the one or more measurement objects, a serving cell measurement object based at least in part on an active BWP of the UE, wherein the serving cell measurement object is associated with an SSB frequency in the active BWP.

In some implementations, an apparatus for wireless communication at a network entity includes a memory and one or more processors, coupled to the memory, configured to: transmit, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE.

In some implementations, a method of wireless communication performed by a UE includes receiving, from a network entity, a configuration that indicates one or more measurement objects, wherein a measurement object of the one or more measurement objects indicates an SSB frequency of a configured BWP; and determining, from the one or more measurement objects, a serving cell measurement object based at least in part on an active BWP of the UE, wherein the serving cell measurement object is associated with an SSB frequency in the active BWP.

In some implementations, a method of wireless communication performed by a network entity includes transmitting, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE.

In some implementations, a non-transitory computer-readable medium storing a set of instructions for wireless communication includes one or more instructions that, when executed by one or more processors of a UE, cause the UE to: receive, from a network entity, a configuration that indicates one or more measurement objects, wherein a measurement object of the one or more measurement objects indicates an SSB frequency of a configured BWP; and determine, from the one or more measurement objects, a serving cell measurement object based at least in part on an active BWP of the UE, wherein the serving cell measurement object is associated with an SSB frequency in the active BWP.

In some implementations, a non-transitory computer-readable medium storing a set of instructions for wireless communication includes one or more instructions that, when executed by one or more processors of a network entity, cause the network entity to: transmit, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE.

In some implementations, an apparatus for wireless communication includes means for receiving, from a network entity, a configuration that indicates one or more measurement objects, wherein a measurement object of the one or more measurement objects indicates an SSB frequency of a configured BWP; and means for determining, from the one or more measurement objects, a serving cell measurement object based at least in part on an active BWP of the apparatus, wherein the serving cell measurement object is associated with an SSB frequency in the active BWP.

In some implementations, an apparatus for wireless communication includes means for transmitting, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-9 are diagrams illustrating example processes associated with serving cell measurement objects associated with active BWPs, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
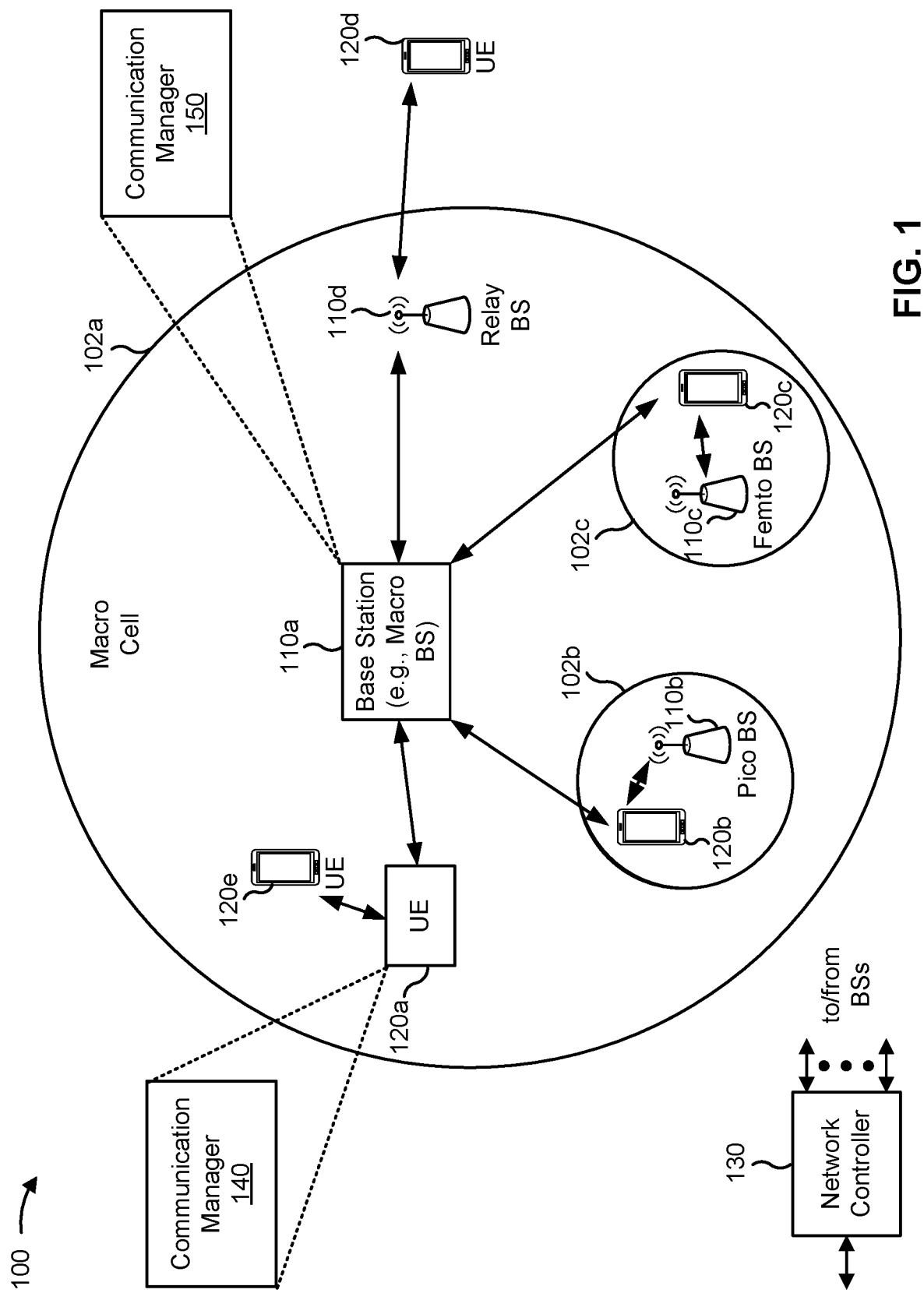
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a configuration that indicates one or more measurement objects, wherein a measurement object of the one or more measurement objects indicates a synchronization signal block (SSB) frequency of a configured bandwidth part (BWP); and determine, from the one or more measurement objects, a serving cell measurement object based at least in part on an active BWP of the UE, wherein the serving cell measurement object is associated with an SSB frequency in the active BWP. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE. Additionally, or alternatively, the communication manager 150 may perform one or more other operations described herein.

As indicated above, FIG. 1 is provided as an example. Other examples may differ from what is described with regard to FIG. 1.

Figure 2:
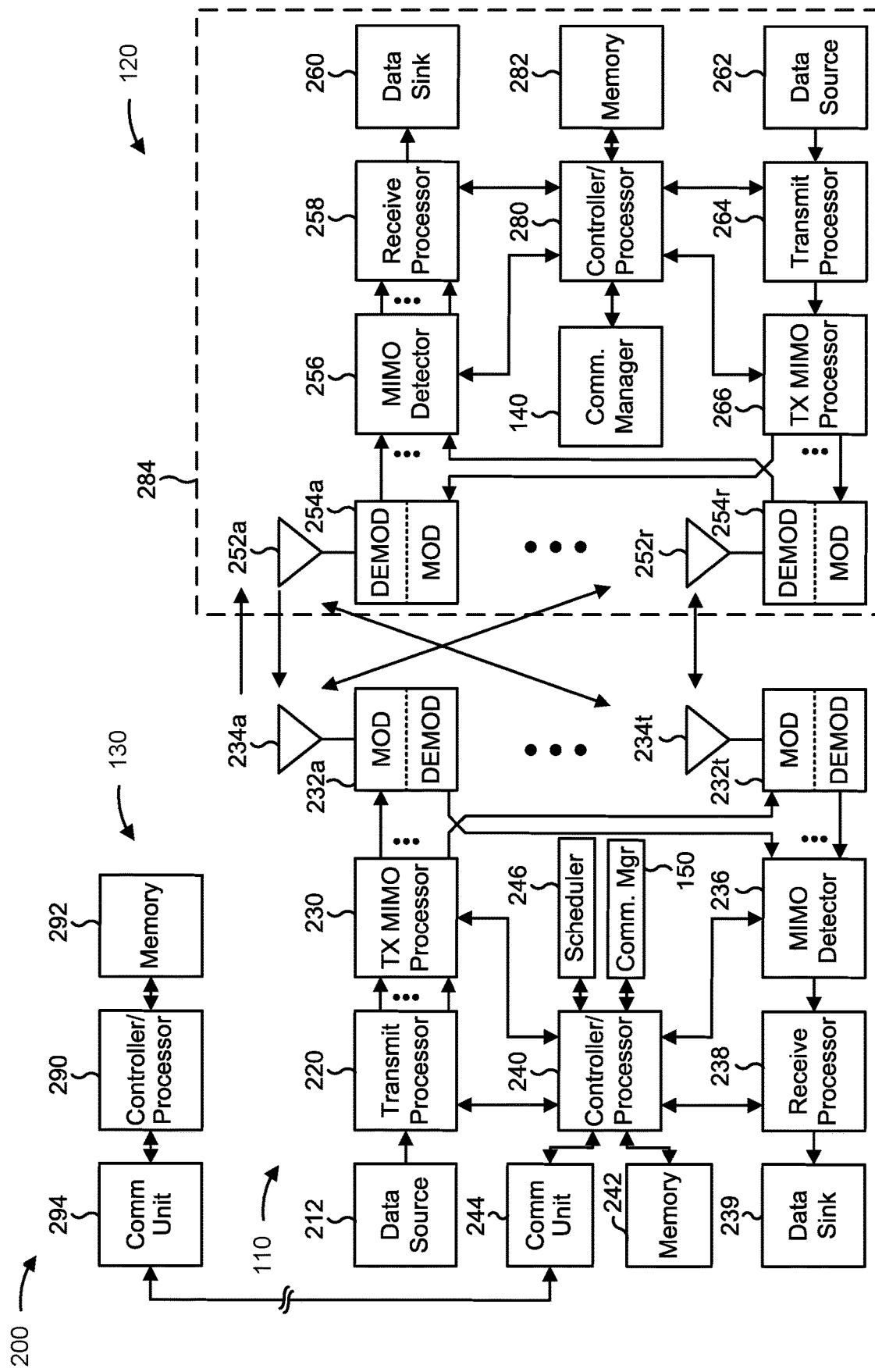
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with serving cell measurement objects associated with active BWPs, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a configuration that indicates one or more measurement objects, wherein a measurement object of the one or more measurement objects indicates an SSB frequency of a configured BWP; and/or means for determining, from the one or more measurement objects, a serving cell measurement object based at least in part on an active BWP of the UE, wherein the serving cell measurement object is associated with an SSB frequency in the active BWP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, a configuration that indicates one or more measurement objects, wherein a measurement object of the one or more measurement objects indicates an SSB frequency in a configured BWP, and wherein a serving cell measurement object from the one or more measurement objects is based at least in part on an active BWP of the UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
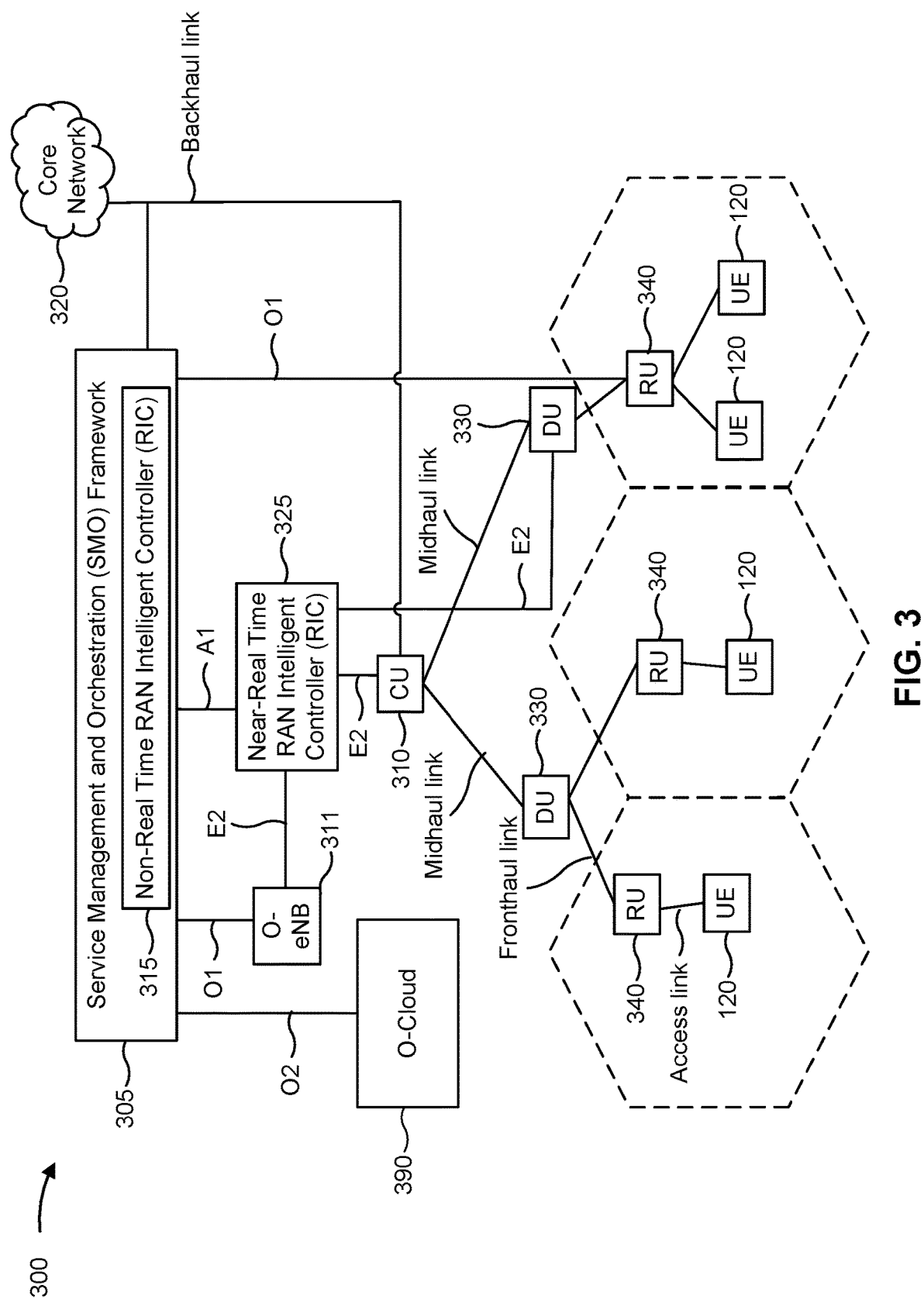
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

A network entity may transmit, to a UE, a serving cell configuration (ServingCellConfig) to configure a serving cell for the UE. The serving cell configuration may indicate an initial downlink BWP (initialDownlinkBWP) parameter, a downlink BWP to release list (downlinkBWP-ToReleaseList) parameter, a downlink BWP to modify list (downlinkBWP-ToAddModList) parameter, and a serving cell measurement object (MO) (servingCellMO). The serving cell measurement object may indicate a measurement object identifier (ID) (MeasObjectId), which may be of a measurement object NR (MeasObjectNR) in a measurement configuration (MeasConfig) which is associated to the serving cell. The network may transmit, to the UE, the measurement object NR to configure a measurement object for NR UEs. The measurement object NR may indicate an SSB frequency (ssbFrequency), which may indicate a frequency of a synchronization signal (SS) associated to the measurement object NR. Further, the serving cell measurement object may not depend on an active BWP of the UE and may not change when the UE's BWP changes.

A neighbor cell SSB may be an intra-frequency when the neighbor cell SSB is aligned with a reference SSB of the serving cell, and when subcarrier spacings of the neighbor cell SSB and the reference SSB are the same. The neighbor cell may be an inter-frequency when the neighbor cell SSB is not aligned with the reference SSB of the serving cell, and when subcarrier spacings of the neighbor cell SSB and the reference SSB are not the same. Intra-frequency cell identification and measurement periods may be different from inter-frequency cell identification and measurement periods. The UE may identify or measure a greater quantity of samples for an inter-frequency cell as compared to an intra-frequency cell.

The network entity may identify whitelisted cells and blacklisted cells, and the network entity may signal an indication of whitelisted cells and blacklisted cells to the UE. A whitelisted cell corresponding to a measurement object may refer to a cell that transmits an SSB at a frequency of that measurement object. The whitelisted cell may refer to the cell that should be measured by the UE. The network entity may indicate to the UE to measure the whitelisted cell. A blacklisted cell corresponding to a measurement object may refer to a cell that should not be measured by the UE. The network entity may indicate to the UE to not measure the blacklisted cell.

Figure 4:
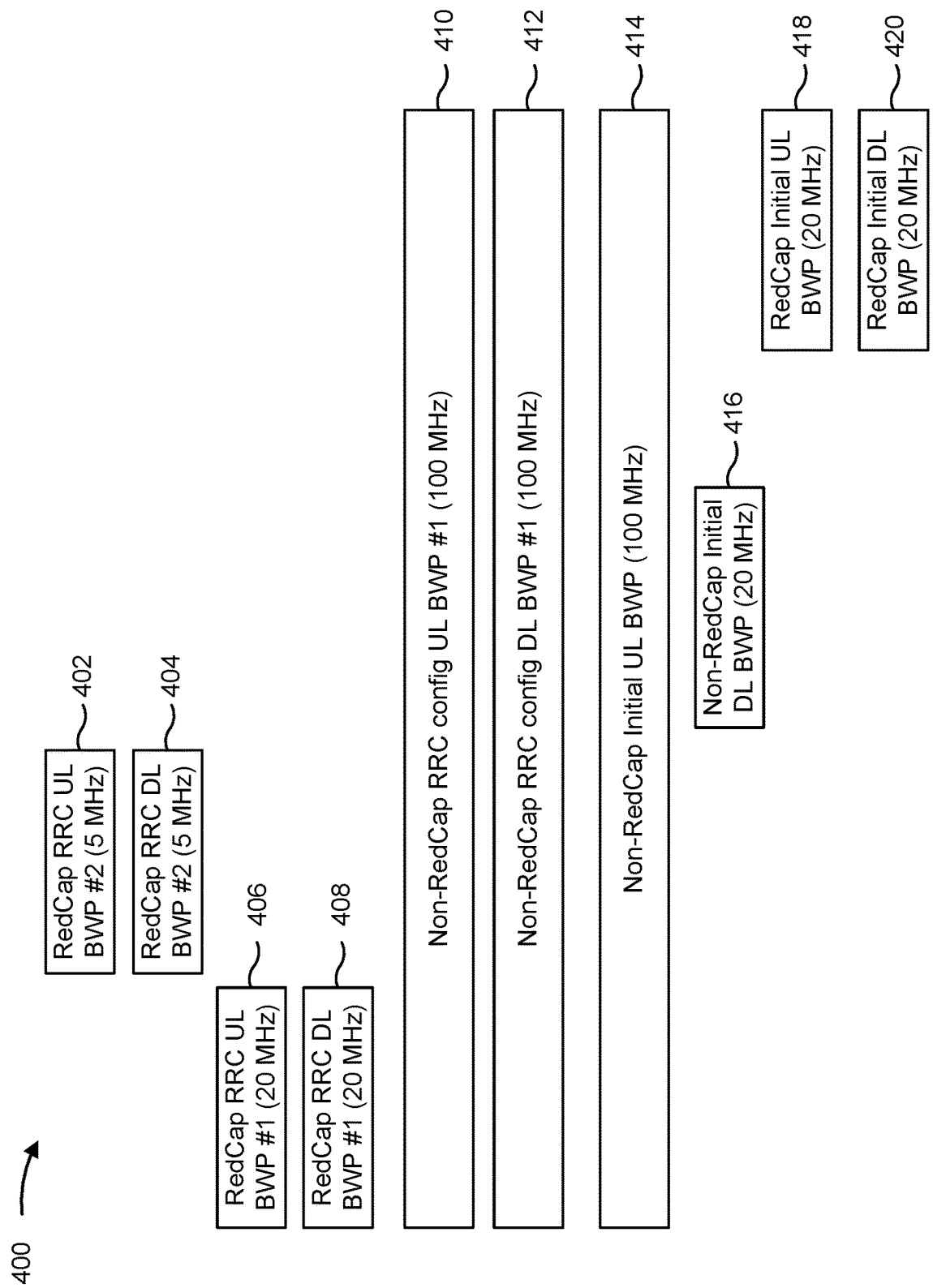
FIG. 4 is a diagram illustrating an example of different bandwidth parts (BWPs) for reduced capability UEs, in accordance with the present disclosure.

FIG. 4 is a diagram illustrating an example 400 of different BWPs for reduced capability UEs, in accordance with the present disclosure.

In some aspects, a network entity may serve different UEs of different categories and/or different UEs that support different capabilities. For example, the network entity may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum MCS than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 milliseconds (ms) or less, 0.5 ms, 0.25 ms, 0.125 ms, 0.0625 ms, or the like, depending on a sub-carrier spacing), and UEs of the first category may not be capable of communicating using the shortened TTI.

As shown in FIG. 4, a plurality of different BWPs may be used for reduced capability UEs and non-reduced capability UEs. A first BWP 402 may be a reduced capability RRC uplink BWP #2 and may span 5 MHz. A second BWP 404 may be a reduced capability RRC downlink BWP #2 and may span 5 MHz. The second BWP 404 may be a configured BWP for a low power mode. The second BWP 404 may not contain a cell-defining SSB (CD-SSB). The second BWP 404 may or may not contain a non-cell-defining SSB (NCD-SSB). A third BWP 406 may be a reduced capability RRC uplink BWP #1 and may span 20 MHz. A fourth BWP 408 may be a reduced capability RRC downlink BWP #1 and may span 20 MHz. The fourth BWP 408 may be a configured BWP for regular active operation. The fourth BWP 408 may not contain a CD-SSB. The fourth BWP 408 may or may not contain an NCD-SSB. A fifth BWP 410 may be a non-reduced capability RRC configured uplink BWP #1 and may span 100 MHz. A sixth BWP 412 may be a non-reduced capability RRC configured downlink BWP #1 and may span 100 MHz. A seventh BWP 414 may be a non-reduced capability initial uplink BWP and may span 100 MHz. An eighth BWP 416 may be a non-reduced capability initial downlink BWP and may span 20 MHz, and may contain a CD-SSB and a control resource set (CORESET). A ninth BWP 418 may be a reduced capability initial uplink BWP and may span 20 MHz. A tenth BWP 420 may be a reduced capability initial downlink BWP and may span 20 MHz.

As indicated above, FIG. 4 is provided as an example. Other examples may differ from what is described with regard to FIG. 4.

Figure 5:
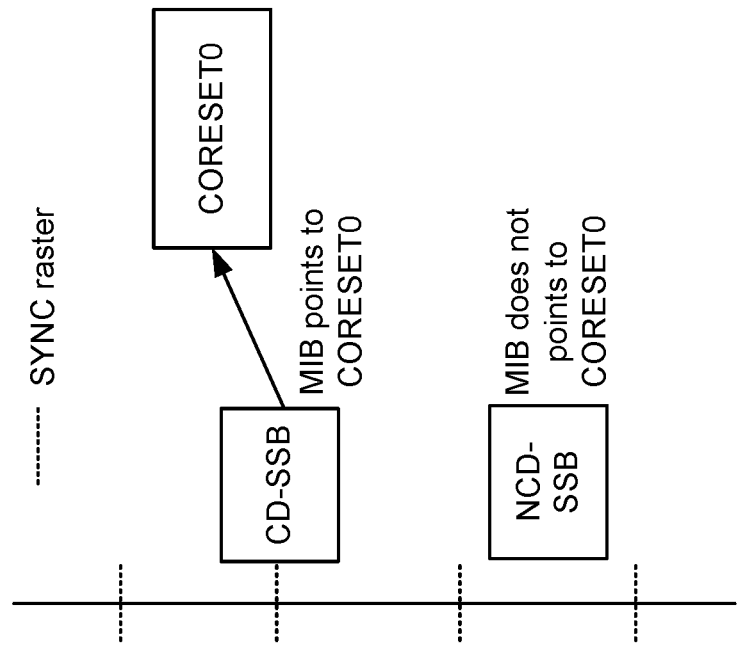
FIG. 5 is a diagram illustrating an example of cell-defining synchronization signal blocks (CD-SSBs) and non-cell-defining synchronization signal blocks (NCD-SSBs), in accordance with the present disclosure.

FIG. 5 is a diagram illustrating an example 500 of CD-SSBs and NCD-SSB, in accordance with the present disclosure.

As shown in FIG. 5, a CD-SSB may be placed in sync raster points and an NCD-SSB may be placed off sync raster points. The CD-SSB may be associated with system information (SI) of a cell, whereas the NCD-SSB may not be associated with SI of a cell. A master information block (MIB) or a system information block (SIB) may indicate a CORESET (e.g., CORESET0) associated with the CD-SSB. The CD-SSB and the NCD-SSB may be quasi-co-located and may have the same physical cell identifier (PCI). The CD-SSB and the NCD-SSB may be associated with different periodicities and different transmit powers. Further, the CD-SSB and the NCD-SSB may be associated with different uplink transmit powers, different selected random access channel (RACH) occasions, and/or different measurement periods.

As indicated above, FIG. 5 is provided as an example. Other examples may differ from what is described with regard to FIG. 5.

Figure 6:
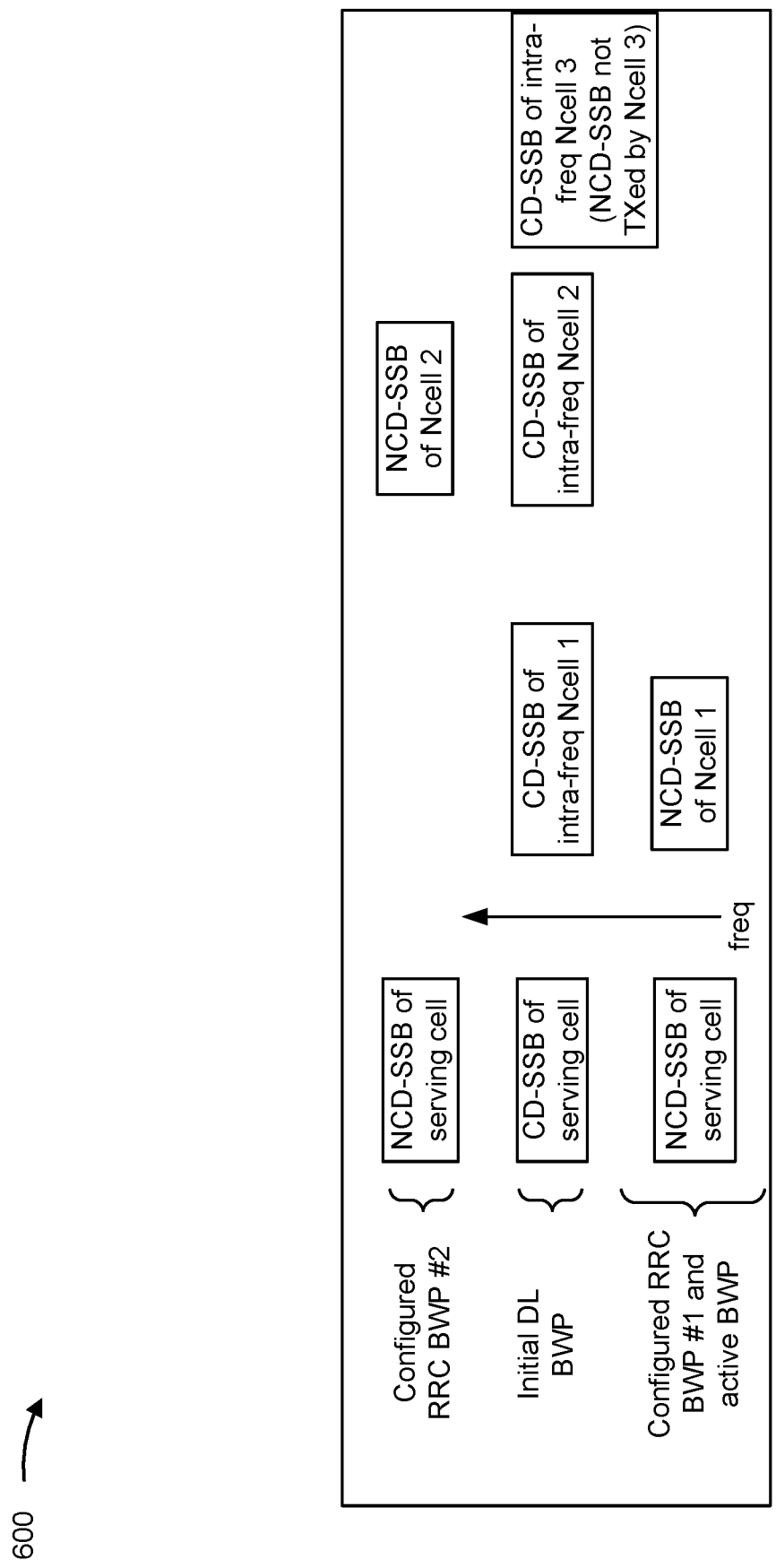
FIG. 6 is a diagram illustrating an example of CD-SSBs and NCD-SSBs for reduced capability UEs, in accordance with the present disclosure.

FIG. 6 is a diagram illustrating an example 600 of CD-SSBs and NCD-SSBs for reduced capability UEs, in accordance with the present disclosure.

A reduced capability UE may be configured with different RRC BWPs. When the reduced capability UE needs an NCD-SSB, each RRC BWP may have at least a CD-SSB or an NCD-SSB. When the reduced capability UE does not need an NCD-SSB, an RRC BWP may only contain a channel state information reference signal (CSI-RS) and no SSB. Further, NCD-SSBs of an intra-frequency neighbor cell (NCell) may be located in different frequency locations.

As shown in FIG. 6, a configured RRC BWP #1 (e.g., an active BWP) may be associated with an NCD-SSB of a serving cell and an NCD-SSB of a first intra-frequency neighbor cell (NCell 1). An initial downlink BWP may be associated with a CD-SSB of the serving cell, a CD-SSB of NCell 1, a CD-SSB of a second intra-frequency neighbor cell (NCell 2), and a CD-SSB of a third intra-frequency neighbor cell (NCell 3), where an NCD-SSB may not be transmitted by NCell 3. A configured RRC BWP #2 may be associated with an NCD-SSB of the serving cell, and an NCD-SSB of NCell 2.

As indicated above, FIG. 6 is provided as an example. Other examples may differ from what is described with regard to FIG. 6.

In legacy NR, a network entity may configure a UE with a serving cell measurement object that contains frequency locations of SSBs. The frequency locations may include intra-frequency locations of SSBs and/or inter-frequency locations of SSBs. However, the serving cell measurement object may not depend on the UE's active BWP location. Since the serving cell measurement object does not depend on the UE's active BWP location, the serving cell measurement object does not change when the UE switches between BWPs, which may cause the UE to perform inaccurate SSB frequency measurements after a BWP switch or may cause the UE to be unable to perform SSB frequency measurements after the BWP switch.

In various aspects of techniques and apparatuses described herein, a UE may receive, from a network entity, a configuration that indicates one or more measurement objects. A measurement object (e.g., each measurement object) of the one or more measurement objects may indicate an SSB frequency of a configured BWP. The UE may determine, from the one or more measurement objects, a serving cell measurement object based at least in part on an active BWP of the UE. The serving cell measurement object may be associated with an SSB frequency in the active BWP. In some aspects, the active BWP of the UE may be a first BWP, and the UE may perform a BWP switching from the first BWP to a second BWP. The first BWP may become inactive, and the second BWP may become active based at least in part on the BWP switching. In some aspects, the UE may autonomously determine, from the one or more measurement objects and based at least in part on the BWP switching, an updated serving cell measurement object based at least in part on the second BWP. The updated serving cell measurement object may be associated with an SSB frequency in the second BWP. The UE may autonomously determine the updated serving cell measurement object since the UE may determine the updated serving cell measurement object without any instructions from the network entity. Alternatively, the UE may receive, from the network entity and based at least in part on the BWP switching, signaling that instructs the UE to determine, from the one or more measurement objects, the updated serving cell measurement object based at least in part on the second BWP.

In some aspects, the network entity may configure the UE (e.g., a reduced capability UE) with multiple SSBs across configured BWPs (e.g., one SSB in each of configured BWP of the UE). The network entity may configure a measurement object for an intra-frequency that contains frequency locations of a plurality of NCD-SSBs (e.g., all NCD-SSBs), or the network entity may configure multiple measurement objects in an intra-frequency, where each measurement object may contain frequency location of one of those NCD-SSBs.

In some aspects, the UE's serving cell measurement object may be based at least in part on the UE's active BWP. After the BWP switching (e.g., the UE moves from an old BWP to a new active BWP), the UE may autonomously update the serving cell measurement object and corresponding measurement object ID (or a serving cell measurement object ID) to be a measurement object ID of a measurement object associated with an SSB in the UE's new active BWP. In other words, the BWP switching may trigger the UE to autonomously update the serving cell measurement object ID. As a result, the UE may be able to perform SSB frequency measurements after the BWP switching.

Alternatively, based at least in part on the BWP switching, the network entity may transmit signaling to the UE that instructs the UE to update the serving cell measurement object and corresponding measurement object ID to be the measurement object ID of the measurement object associated with the SSB in the UE's new active BWP. The network entity may perform the signaling using RRC or a medium access control control element (MAC-CE). However, the UE autonomously updating the serving cell measurement object and corresponding measurement object ID without explicit signaling from the network entity may reduce a signaling overhead.

In some aspects, the UE may require a minimum time to autonomously update the serving cell measurement object ID, which may be different from a BWP switching delay. The network entity may configure both CD-SSBs and an NCD-SSBs in measurement objects for intra-frequency NCell SSBs. Further, when the UE updates the serving cell measurement object based at least in part on the BWP switching, identification/measurement requirements for the NCell and whitelisted/blacklisted cells corresponding to the serving cell measurement object may updated based at least in part on the BWP switch.

Figure 7:
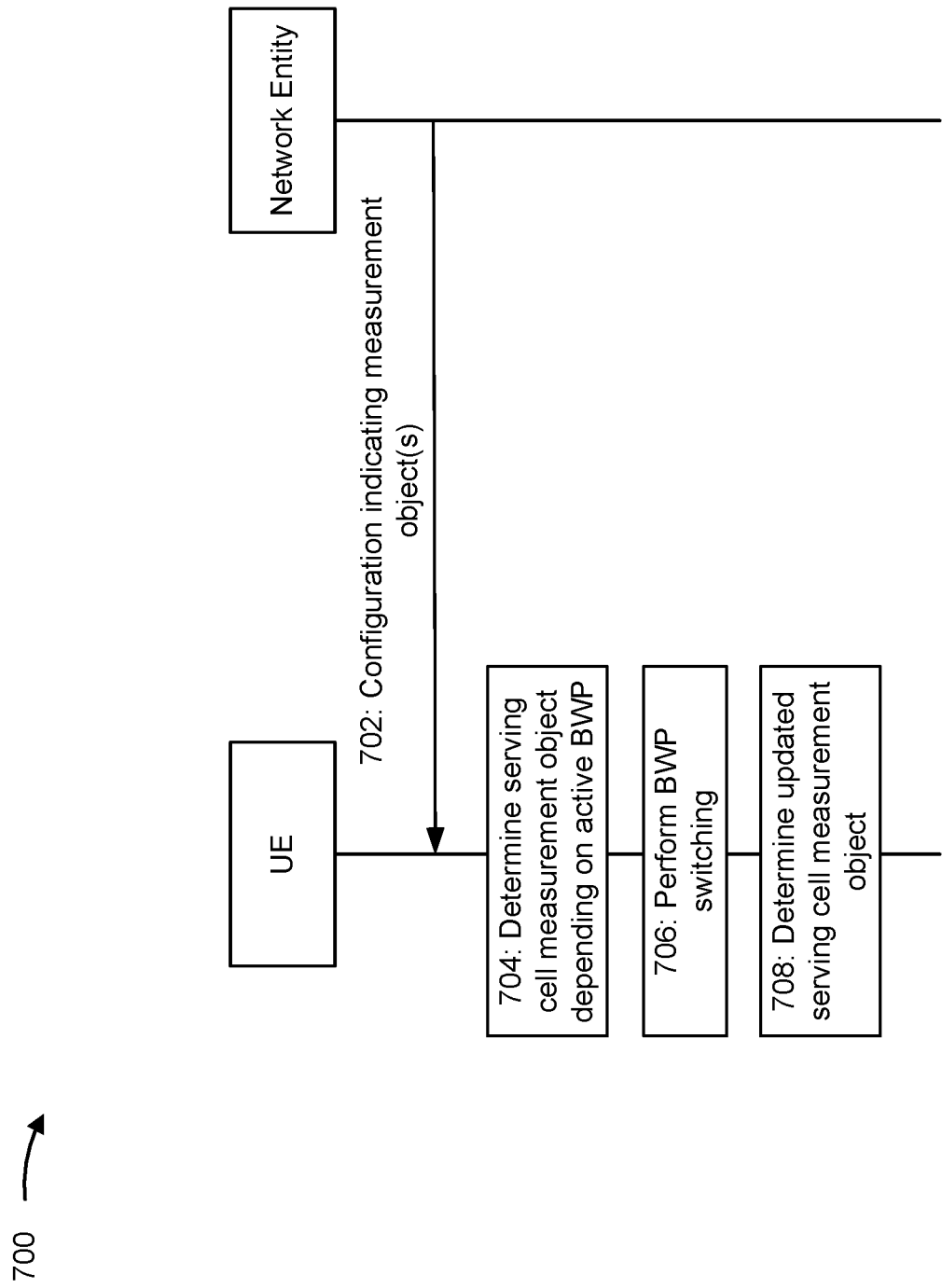
FIG. 7 is a diagram illustrating an example associated with serving cell measurement objects associated with active BWPs, in accordance with the present disclosure.

FIG. 7 is a diagram illustrating an example 700 associated with serving cell measurement objects associated with active BWPs, in accordance with the present disclosure. As shown in FIG. 7, example 700 includes communication between a UE (e.g., UE 120) and a network entity (e.g., base station 110). In some aspects, the UE and the network entity may be included in a wireless network, such as wireless network 100.

In some aspects, the UE may be a reduced capability UE. The reduced capability UE may refer to a group of UEs having a maximum UE RF bandwidth that is less than other NR UEs that would operate in the same channel as these reduced capability UEs. As an example, a maximum RF bandwidth for reduced capability UEs may be 20 MHz in FR1 and 100 MHz in FR2.

As shown by reference number 702, the UE may receive, from the network entity, a configuration that indicates one or more measurement objects. A measurement object (e.g., each measurement object) of the one or more measurement objects may indicate an SSB frequency of a configured BWP. The SSB frequency associated with the measurement object may be an NCD-SSB frequency of the configured BWP or a CD-SSB frequency of the configured BWP. In other words, the UE may be configured with multiple measurement objects within an intra-frequency, where each measurement object may indicate a CD-SSB/NCD-SSB location of different configured BWPs. In some aspects, the network entity may configure the UE with multiple SSBs across configured BWPs (e.g., one SSB in each of configured BWP of the UE). The network entity may configure a measurement object for an intra-frequency that contains frequency locations of a plurality of NCD-SSBs (e.g., all NCD-SSBs), or the network entity may configure multiple measurement objects in an intra-frequency, where each measurement object may contain frequency location of one of those NCD-SSBs.

As shown by reference number 704, the UE may determine, from the one or more measurement objects, a serving cell measurement object based at least in part on an active BWP of the UE. In other words, the UE's serving cell measurement object may be based at least in part on the UE's active BWP location. The serving cell measurement object may be a measurement object associated with a serving cell of the UE. The serving cell measurement object may be associated with an SSB frequency in the active BWP. When the active BWP does not contain an NCD-SSB (or excludes the NCD-SB), a CD-SSB may be associated with the serving cell measurement object or the CD-SSB may be a default serving cell measurement object. In some aspects, the UE may select a measurement object from the one or more measurement objects to serve as the serving cell measurement object, where the UE may select the measurement object based at least in part on a BWP associated with the measurement object corresponding to the active BWP of the UE. In some aspects, the serving cell measurement object may be associated with a reference SSB of the serving cell of the UE. The reference SSB may be the NCD-SSB within the active BWP, or the reference SSB may be a the-SSB inside or outside of the active BWP.

As shown by reference number 706, the active BWP of the UE may be a first BWP, and the UE may perform a BWP switching from the first BWP to a second BWP. The first BWP may become inactive, and the second BWP may become active based at least in part on the BWP switching. In some aspects, the UE may perform the BWP switching based at least in part on signaling from the network entity, or the UE may perform the BWP switching based at least in part on an expiration of a timer. For example, the UE may perform the BWP switching based at least in part on downlink control information (DCI), RRC signaling, or a MAC-CE received from the network entity.

As shown by reference number 708, the UE may determine, from the one or more measurement objects and based at least in part on the BWP switching, an updated serving cell measurement object based at least in part on the second BWP, where the updated serving cell measurement object may be associated with an SSB frequency in the second BWP. In some aspects, the UE may autonomously determine the updated serving cell measurement object. The UE may autonomously update the serving cell measurement object when the UE changes between BWPs. In this case, the UE may determine the updated serving cell measurement object without being instructed by the network. Alternatively, the UE may receive, from the network entity and based at least in part on the BWP switching, signaling that instructs the UE to determine, from the one or more measurement objects, the updated serving cell measurement object based at least in part on the second BWP.

In some aspects, the network entity may instruct the UE to update the serving cell measurement object after the BWP switching. The network entity may instruct the UE to update the serving cell measurement object via DCI, RRC signaling, or a MAC-CE. However, updating the serving cell measurement object based at least in part on an instruction from the network entity may involve increased signaling overhead, as compared to when the UE autonomously updates the serving cell measurement object after the BWP switching.

In some aspects, after the BWP switching (e.g., after the UE moves from an old BWP to a new active BWP), the UE may update the serving cell measurement object and corresponding measurement object ID (or a serving cell measurement object ID) to be a measurement object ID of a measurement object associated with an SSB in the UE's new active BWP. In other words, the BWP switching may trigger the UE to update the serving cell measurement object ID. As a result, the UE may be able to perform SSB frequency measurements after the BWP switching.

In some aspects, the UE may determine, from the one or more measurement objects, the updated serving cell measurement object in accordance with a time duration that is different than a BWP switching delay. In some aspects, a time needed for the UE to update the serving cell measurement object may be different than the BWP switching delay. For example, a DCI based BWP switching delay may be 2.50 ms, but the UE may need 4 ms to update the serving cell measurement object. The UE may ignore performing measurements during a transition period to the updated serving cell measurement object.

In some aspects, the UE may determine, based at least in part on the BWP switching, whether a reference SSB of a neighbor cell becomes an intra-frequency SSB or an inter-frequency SSB. The UE may identify and measure the reference SSB of the neighbor cell within a time period. The time period may be based at least in part on whether the reference SSB of the neighbor cell is the intra-frequency SSB or the inter-frequency SSB. A time period to identify and measure the inter-frequency SSB may be greater than a time period to identify and measure the intra-frequency SSB.

In some aspects, depending on a reference SSB change of the serving cell due to the BWP switching, reference SSBs of neighbor cells may become intra-frequency SSBs or inter-frequency SSBs. As an example, by using FIG. 6 as a reference, in an RRC BWP #1, only an NCD-SSB of NCell1 may be an intra-frequency SSB and all other NCell SSBs may be inter-frequency SSBs. In an RRC BWP #2, only an NCD-SSB of NCell2 may be an intra-frequency SSB and all other NCell SSBs may be inter-frequency SSBs. Depending on the reference SSB change of the serving cell, identification and measurement delay requirements of neighbor cell SSBs may be autonomously changed at the UE accordingly.

In some aspects, the UE may determine, based at least in part on the BWP switching, whitelisted cells associated with the serving cell measurement object. In some aspects, depending on the BWP switching and corresponding change to the reference SSB of the serving cell, whitelisted cells corresponding to the serving cell measurement object may be autonomously changed at the UE accordingly. As an example, by using FIG. 6 as a reference, in an initial downlink BWP, whitelisted cells may be NCell1, NCell2 and NCell3. In an RRC configured BWP #1, whitelisted cells may only be cell NCell1. In an RRC configured BWP #2, whitelisted cells may only be cell NCell2.

In some aspects, the network entity may determine, based at least in part on the BWP switching at the UE, whether the reference SSB of the neighbor cell becomes the intra-frequency SSB or the inter-frequency SSB. The network entity may transmit, to the UE, an indication of whether the reference SSB of the neighbor cell becomes the intra-frequency SSB or the inter-frequency SSB. In some aspects, the network entity may determine, based at least in part on the BWP switching at the UE, whitelisted cells associated with the serving cell measurement object. The UE may transmit, to the UE, an indication of the whitelisted cells associated with the serving cell measurement object.

As indicated above, FIG. 7 is provided as an example. Other examples may differ from what is described with regard to FIG. 7.

Figure 8:
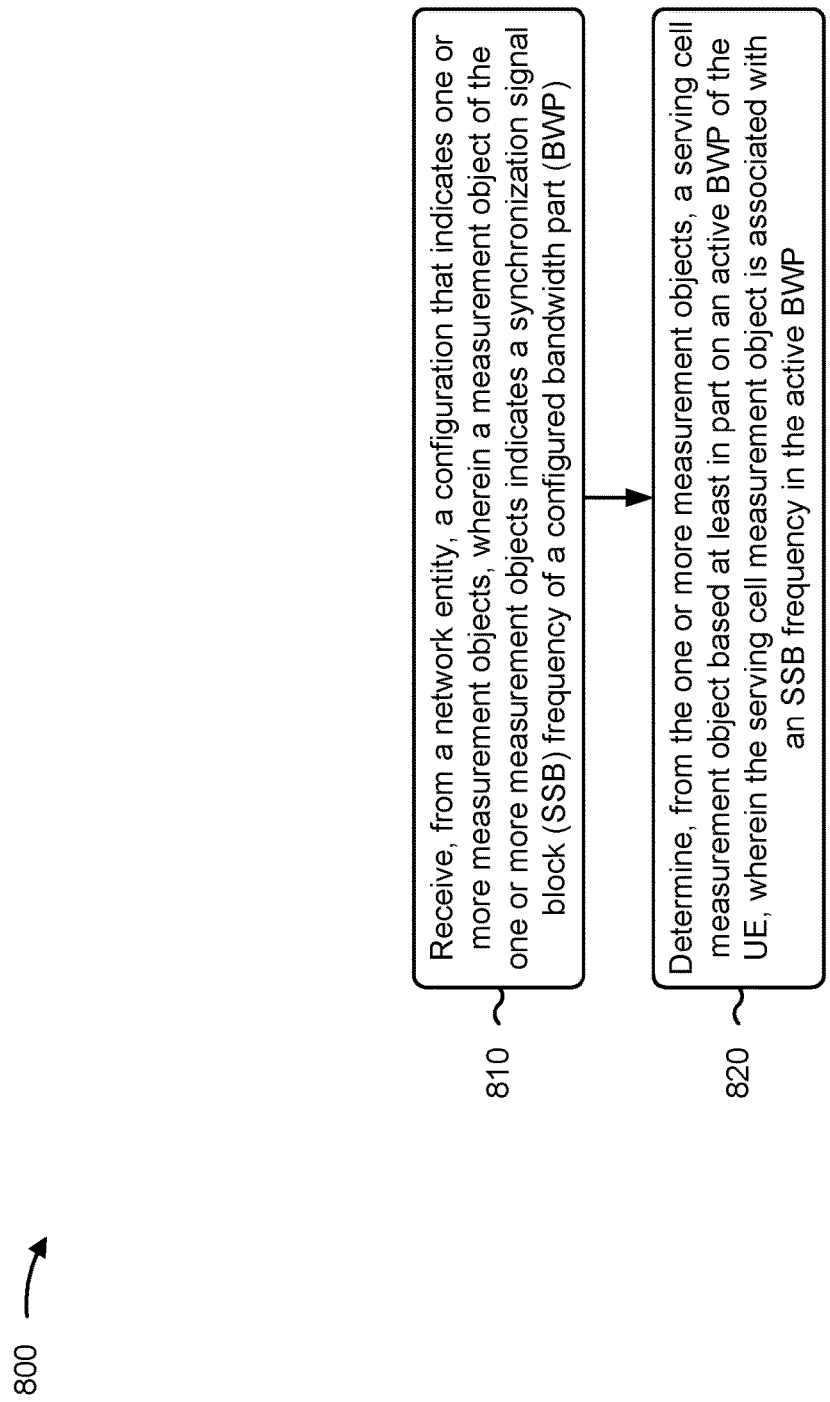

FIG. 8 is a diagram illustrating an example process 800 performed, for example, by a UE, in accordance with the present disclosure. Example process 800 is an example where the UE (e.g., UE 120) performs operations associated with serving cell measurement objects associated with active BWPs.

As shown in FIG. 8, in some aspects, process 800 may include receiving, from a network entity, a configuration that indicates one or more measurement objects, wherein a measurement object of the one or more measurement objects indicates an SSB frequency of a configured BWP (block 810). For example, the UE (e.g., using communication manager 140 and/or reception component 1002, depicted in FIG. 10) may receive, from a network entity, a configuration that indicates one or more measurement objects, wherein a measurement object of the one or more measurement objects indicates an SSB frequency of a configured BWP, as described above.

As further shown in FIG. 8, in some aspects, process 800 may include determining, from the one or more measurement objects, a serving cell measurement object based at least in part on an active BWP of the UE, wherein the serving cell measurement object is associated with an SSB frequency in the active BWP (block 820). For example, the UE (e.g., using communication manager 140 and/or determination component 1008, depicted in FIG. 10) may determine, from the one or more measurement objects, a serving cell measurement object based at least in part on an active BWP of the UE, wherein the serving cell measurement object is associated with an SSB frequency in the active BWP, as described above.

Process 800 may include additional aspects, such as any single aspect or any combination of aspects described below and/or in connection with one or more other processes described elsewhere herein.

In a first aspect, the SSB frequency associated with the measurement object, of the one or more measurement objects, is an NCD-SSB frequency of the configured BWP or a CD-SSB frequency of the configured BWP.

In a second aspect, alone or in combination with the first aspect, the active BWP of the UE is a first BWP, and process 800 includes performing a BWP switching from the first BWP to a second BWP, wherein the first BWP becomes inactive and the second BWP becomes active based at least in part on the BWP switching.

In a third aspect, alone or in combination with one or more of the first and second aspects, process 800 includes autonomously determining, from the one or more measurement objects and based at least in part on the BWP switching, an updated serving cell measurement object based at least in part on the second BWP, wherein the updated serving cell measurement object is associated with an SSB frequency in the second BWP.

In a fourth aspect, alone or in combination with one or more of the first through third aspects, process 800 includes performing the BWP switching based at least in part on signaling from the network entity.

In a fifth aspect, alone or in combination with one or more of the first through fourth aspects, process 800 includes performing the BWP switching based at least in part on an expiration of a timer.

In a sixth aspect, alone or in combination with one or more of the first through fifth aspects, process 800 includes receiving, from the network entity and based at least in part on the BWP switching, signaling that instructs the UE to determine, from the one or more measurement objects, an updated serving cell measurement object based at least in part on the second BWP.

In a seventh aspect, alone or in combination with one or more of the first through sixth aspects, process 800 includes determining, from the one or more measurement objects, an updated serving cell measurement object in accordance with a time duration that is different than a BWP switching delay.

In an eighth aspect, alone or in combination with one or more of the first through seventh aspects, process 800 includes determining, based at least in part on a BWP switching, whether a reference SSB of a neighbor cell becomes an intra-frequency SSB or an inter-frequency SSB.

In a ninth aspect, alone or in combination with one or more of the first through eighth aspects, process 800 includes identifying and measuring the reference SSB of the neighbor cell within a time period, wherein the time period is based at least in part on whether the reference SSB of the neighbor cell is the intra-frequency SSB or the inter-frequency SSB.

In a tenth aspect, alone or in combination with one or more of the first through ninth aspects, a time period to identify and measure the inter-frequency SSB is greater than a time period to identify and measure the intra-frequency SSB.

In an eleventh aspect, alone or in combination with one or more of the first through tenth aspects, process 800 includes determining, based at least in part on a BWP switching, whitelisted cells associated with the serving cell measurement object.

In a twelfth aspect, alone or in combination with one or more of the first through eleventh aspects, the active BWP excludes an NCD-SSB, and a CD-SSB is associated with the serving cell measurement object.

In a thirteenth aspect, alone or in combination with one or more of the first through twelfth aspects, the serving cell measurement object is associated with a reference SSB of a serving cell of the UE, and the reference SSB is an NCD-SSB within the active BWP or a CD-SSB inside or outside of the active BWP.

In a fourteenth aspect, alone or in combination with one or more of the first through thirteenth aspects, the UE is a reduced capability UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network entity, in accordance with the present disclosure. Example process 900 is an example where the network entity (e.g., base station 110) performs operations associated with.

As shown in FIG. 9, in some aspects, process 900 may include transmitting, to a UE, a configuration that indicates one or more measurement objects, wherein a measurement object of the one or more measurement objects indicates an SSB frequency in a configured BWP, and a serving cell measurement object from the one or more measurement objects is based at least in part on an active BWP of the UE (block 910). For example, the network entity (e.g., using communication manager 150 and/or transmission component 1104, depicted in FIG. 11) may transmit, to a UE, a configuration that indicates one or more measurement objects, wherein a measurement object of the one or more measurement objects indicates an SSB frequency in a configured BWP, and a serving cell measurement object from the one or more measurement objects is based at least in part on an active BWP of the UE, as described above.

Process 900 may include additional aspects, such as any single aspect or any combination of aspects described below and/or in connection with one or more other processes described elsewhere herein.

In a first aspect, the serving cell measurement object is associated with an SSB frequency in the active BWP.

In a second aspect, alone or in combination with the first aspect, the SSB frequency associated with the measurement object, of the one or more measurement objects, is an NCD-SSB frequency of the configured BWP or a CD-SSB frequency of the configured BWP.

In a third aspect, alone or in combination with one or more of the first and second aspects, the active BWP of the UE is a first BWP, and process 900 includes transmitting, to the UE and based at least in part on a BWP switching at the UE from the first BWP to a second BWP, signaling that instructs the UE to determine, from the one or more measurement objects, an updated serving cell measurement object based at least in part on the second BWP.

In a fourth aspect, alone or in combination with one or more of the first through third aspects, the BWP switching is based at least in part on signaling from the network entity or an expiration of a timer.

In a fifth aspect, alone or in combination with one or more of the first through fourth aspects, the active BWP excludes an NCD-SSB, and a CD-SSB is associated with the serving cell measurement object.

In a sixth aspect, alone or in combination with one or more of the first through fifth aspects, the serving cell measurement object is associated with a reference SSB of a serving cell of the UE, and the reference SSB is an NCD-SSB within the active BWP or a CD-SSB inside or outside of the active BWP.

In a seventh aspect, alone or in combination with one or more of the first through sixth aspects, process 900 includes determining, based at least in part on a BWP switching at the UE, whether a reference SSB of a neighbor cell becomes an intra-frequency SSB or an inter-frequency SSB, and transmitting, to the UE, an indication of whether the reference SSB of the neighbor cell becomes the intra-frequency SSB or the inter-frequency SSB.

In an eighth aspect, alone or in combination with one or more of the first through seventh aspects, process 900 includes determining, based at least in part on a BWP switching at the UE, whitelisted cells associated with the serving cell measurement object, and transmitting, to the UE, an indication of the whitelisted cells associated with the serving cell measurement object.

In a ninth aspect, alone or in combination with one or more of the first through eighth aspects, the UE is a reduced capability UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
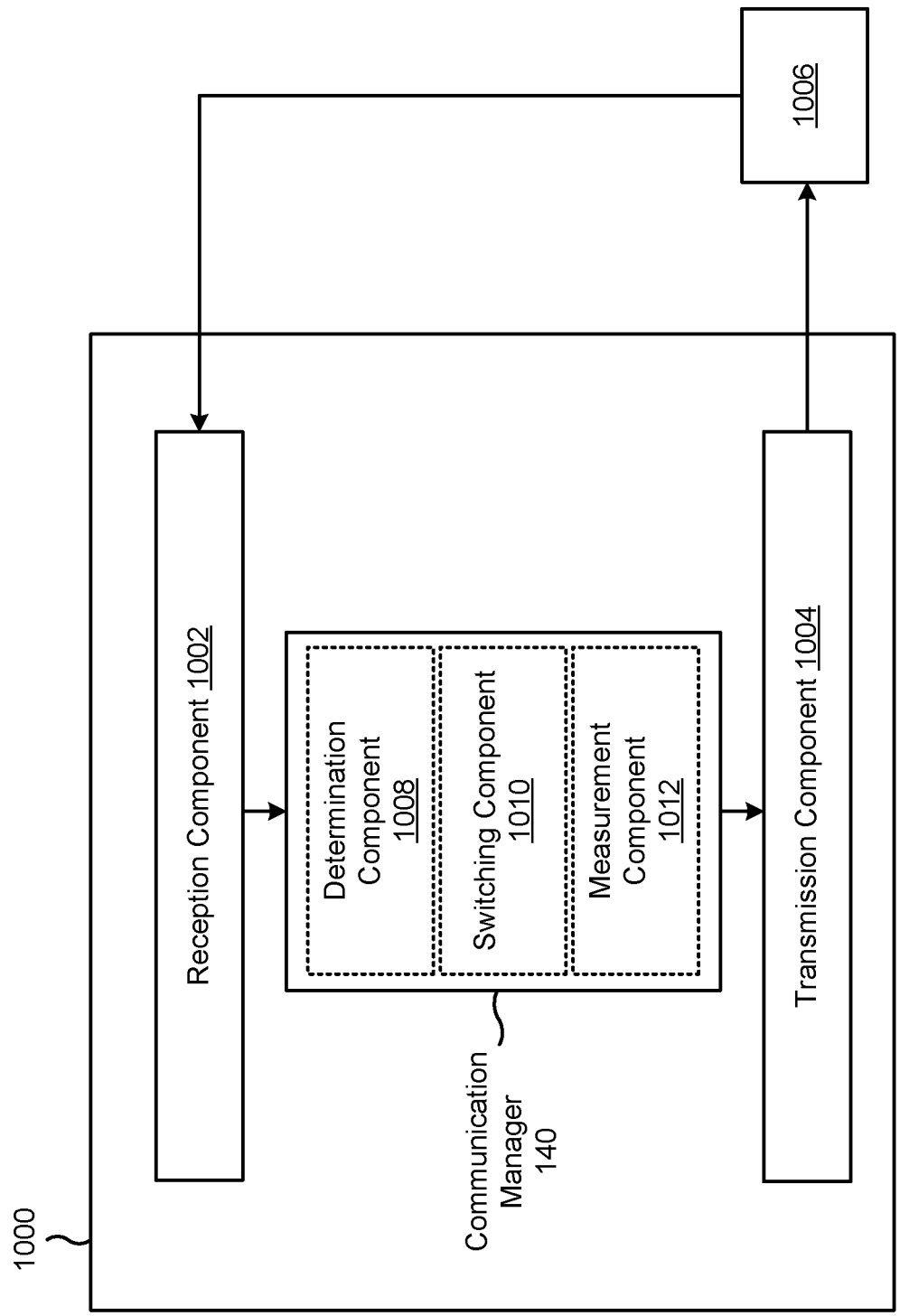
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a determination component 1008, a switching component 1010, or a measurement component 1012, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network entity, a configuration that indicates one or more measurement objects, wherein a measurement object of the one or more measurement objects indicates an SSB frequency of a configured BWP. The determination component 1008 may determine, from the one or more measurement objects, a serving cell measurement object based at least in part on an active BWP of the UE, wherein the serving cell measurement object is associated with an SSB frequency in the active BWP.

The switching component 1010 may perform a BWP switching from a first BWP to a second BWP, wherein the active BWP of the UE may be the first BWP, and the first BWP becomes inactive and the second BWP becomes active based at least in part on the BWP switching. The determination component 1008 may autonomously determine, from the one or more measurement objects and based at least in part on the BWP switching, an updated serving cell measurement object based at least in part on the second BWP, wherein the updated serving cell measurement object is associated with an SSB frequency in the second BWP.

The switching component 1010 may perform the BWP switching based at least in part on signaling from the network entity. The switching component 1010 may perform the BWP switching based at least in part on an expiration of a timer. The reception component 1002 may receive, from the network entity and based at least in part on the BWP switching, signaling that instructs the UE to determine, from the one or more measurement objects, an updated serving cell measurement object based at least in part on the second BWP.

The determination component 1008 may determine, from the one or more measurement objects, an updated serving cell measurement object in accordance with a time duration that is different than a BWP switching delay. The determination component 1008 may determine, based at least in part on a BWP switching, whether a reference SSB of a neighbor cell becomes an intra-frequency SSB or an inter-frequency SSB. The measurement component 1012 may identify and measuring the reference SSB of the neighbor cell within a time period, wherein the time period is based at least in part on whether the reference SSB of the neighbor cell is the intra-frequency SSB or the inter-frequency SSB. The determination component 1008 may determine, based at least in part on a BWP switching, whitelisted cells associated with the serving cell measurement object.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
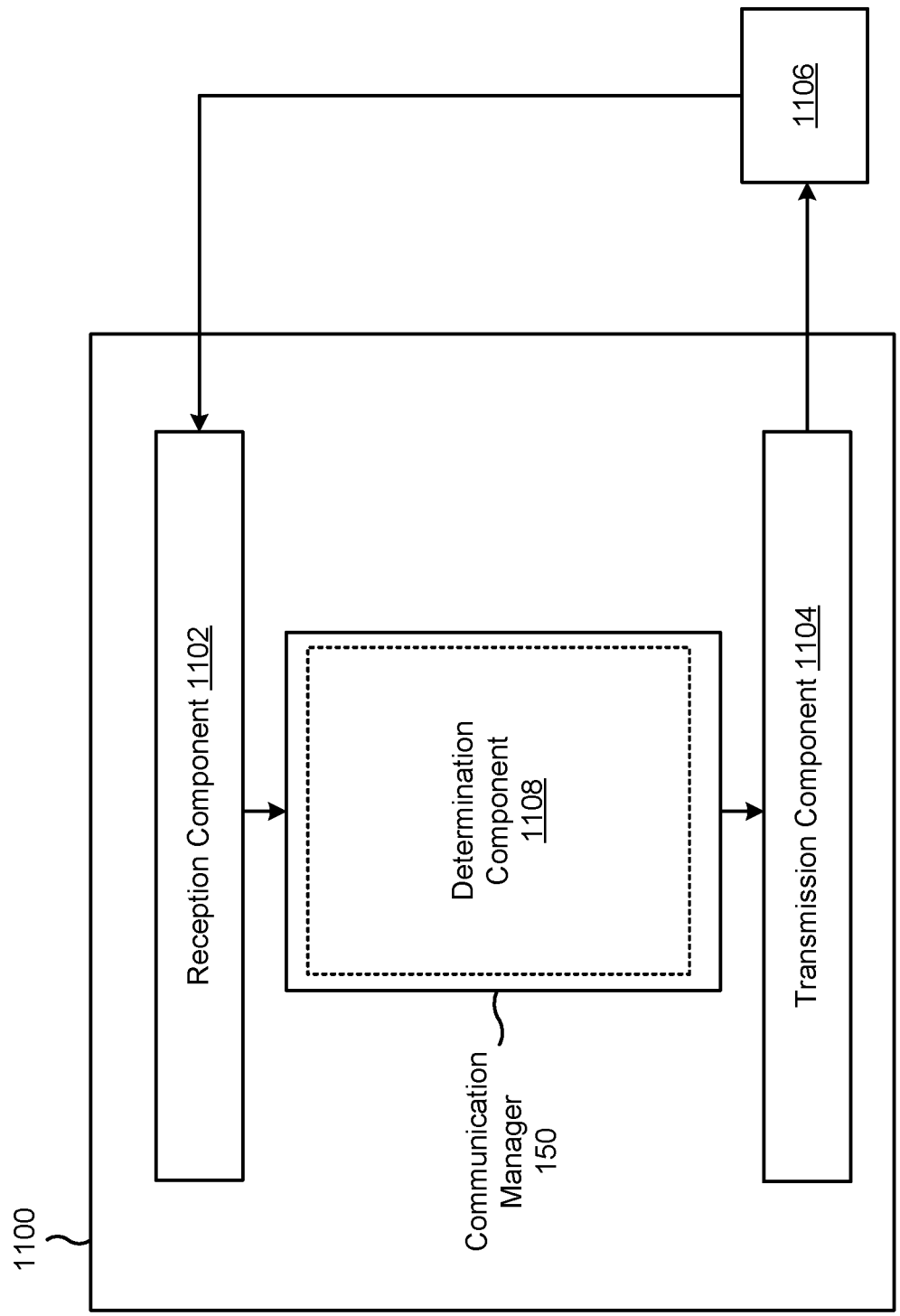

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The transmission component 1104 may transmit, to a UE, a configuration that indicates one or more measurement objects, wherein a measurement object of the one or more measurement objects indicates an SSB frequency in a configured BWP, and a serving cell measurement object from the one or more measurement objects is based at least in part on an active BWP of the UE.

The transmission component 1104 may transmit, to the UE and based at least in part on a BWP switching at the UE from a first BWP to a second BWP, signaling that instructs the UE to determine, from the one or more measurement objects, an updated serving cell measurement object based at least in part on the second BWP, wherein the active BWP of the UE is the first BWP. The determination component 1108 may determine, based at least in part on a BWP switching at the UE, whether a reference SSB of a neighbor cell becomes an intra-frequency SSB or an inter-frequency SSB. The transmission component 1104 may transmit, to the UE, an indication of whether the reference SSB of the neighbor cell becomes the intra-frequency SSB or the inter-frequency SSB. The determination component 1108 may determine, based at least in part on a BWP switching at the UE, whitelisted cells associated with the serving cell measurement object. The transmission component 1104 may transmit, to the UE, an indication of the whitelisted cells associated with the serving cell measurement object.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network entity, a configuration that indicates one or more measurement objects, wherein a measurement object of the one or more measurement objects indicates a synchronization signal block (SSB) frequency of a configured bandwidth part (BWP); and determining, from the one or more measurement objects, a serving cell measurement object based at least in part on an active BWP of the UE, wherein the serving cell measurement object is associated with an SSB frequency in the active BWP.

Aspect 2: The method of Aspect 1, wherein the SSB frequency associated with the measurement object, of the one or more measurement objects, is a non-cell-defining SSB frequency of the configured BWP or a cell-defining SSB frequency of the configured BWP.

Aspect 3: The method of any of Aspects 1 through 2, wherein the active BWP of the UE is a first BWP, and further comprising: performing a BWP switching from the first BWP to a second BWP, wherein the first BWP becomes inactive and the second BWP becomes active based at least in part on the BWP switching.

Aspect 4: The method of Aspect 3, further comprising: autonomously determining, from the one or more measurement objects and based at least in part on the BWP switching, an updated serving cell measurement object based at least in part on the second BWP, wherein the updated serving cell measurement object is associated with an SSB frequency in the second BWP.

Aspect 5: The method of Aspect 3, wherein performing the BWP switching is based at least in part on signaling from the network entity.

Aspect 6: The method of Aspect 3, wherein performing the BWP switching is based at least in part on an expiration of a timer.

Aspect 7: The method of Aspect 3, further comprising: receiving, from the network entity and based at least in part on the BWP switching, signaling that instructs the UE to determine, from the one or more measurement objects, an updated serving cell measurement object based at least in part on the second BWP.

Aspect 8: The method of Aspect 3, further comprising: determining, from the one or more measurement objects, an updated serving cell measurement object in accordance with a time duration that is different than a BWP switching delay.

Aspect 9: The method of Aspect 3, further comprising: determining, based at least in part on a BWP switching, whether a reference SSB of a neighbor cell becomes an intra-frequency SSB or an inter-frequency SSB.

Aspect 10: The method of Aspect 9, further comprising: identifying and measuring the reference SSB of the neighbor cell within a time period, wherein the time period is based at least in part on whether the reference SSB of the neighbor cell is the intra-frequency SSB or the inter-frequency SSB.

Aspect 11: The method of Aspect 10, where a time period to identify and measure the inter-frequency SSB is greater than a time period to identify and measure the intra-frequency SSB.

Aspect 12: The method of Aspect 3, further comprising: determining, based at least in part on a BWP switching, whitelisted cells associated with the serving cell measurement object.

Aspect 13: The method of any of Aspects 1 through 12, wherein the active BWP excludes a non-cell-defining SSB, and a cell-defining SSB is associated with the serving cell measurement object.

Aspect 14: The method of any of Aspects 1 through 13, wherein the serving cell measurement object is associated with a reference SSB of a serving cell of the UE, and wherein the reference SSB is a non-cell-defining SSB within the active BWP or a cell-defining SSB inside or outside of the active BWP.

Aspect 15: The method of any of Aspects 1 through 14, wherein the UE is a reduced capability UE.

Aspect 16: A method of wireless communication performed by a network entity, comprising: transmitting, to a user equipment (UE), a configuration that indicates one or more measurement objects, wherein a measurement object of the one or more measurement objects indicates a synchronization signal block (SSB) frequency in a configured bandwidth part (BWP), and wherein a serving cell measurement object from the one or more measurement objects is based at least in part on an active BWP of the UE.

Aspect 17: The method of Aspect 16, wherein the serving cell measurement object is associated with an SSB frequency in the active BWP.

Aspect 18: The method of any of Aspects 16 through 17, wherein the SSB frequency associated with the measurement object, of the one or more measurement objects, is a non-cell-defining SSB frequency of the configured BWP or a cell-defining SSB frequency of the configured BWP.

Aspect 19: The method of any of Aspects 16 through 18, wherein the active BWP of the UE is a first BWP, and further comprising: transmitting, to the UE and based at least in part on a BWP switching at the UE from the first BWP to a second BWP, signaling that instructs the UE to determine, from the one or more measurement objects, an updated serving cell measurement object based at least in part on the second BWP.

Aspect 20: The method of Aspect 19, wherein the BWP switching is based at least in part on signaling from the network entity or an expiration of a timer.

Aspect 21: The method of any of Aspects 16 through 20, wherein the active BWP excludes a non-cell-defining SSB, and a cell-defining SSB is associated with the serving cell measurement object.

Aspect 22: The method of any of Aspects 16 through 21, wherein the serving cell measurement object is associated with a reference SSB of a serving cell of the UE, and wherein the reference SSB is a non-cell-defining SSB within the active BWP or a cell-defining SSB inside or outside of the active BWP.

Aspect 23: The method of any of Aspects 16 through 22, further comprising: determining, based at least in part on a BWP switching at the UE, whether a reference SSB of a neighbor cell becomes an intra-frequency SSB or an inter-frequency SSB; and transmitting, to the UE, an indication of whether the reference SSB of the neighbor cell becomes the intra-frequency SSB or the inter-frequency SSB.

Aspect 24: The method of any of Aspects 16 through 23, further comprising: determining, based at least in part on a BWP switching at the UE, whitelisted cells associated with the serving cell measurement object; and transmitting, to the UE, an indication of the whitelisted cells associated with the serving cell measurement object.

Aspect 25: The method of any of Aspects 16 through 24, wherein the UE is a reduced capability UE.

Aspect 26: An apparatus for wireless communication at a device, comprising a processor; memory coupled with the processor; and instructions stored in the memory and executable by the processor to cause the apparatus to perform the method of one or more of Aspects 1-15.

Aspect 27: A device for wireless communication, comprising a memory and one or more processors coupled to the memory, the one or more processors configured to perform the method of one or more of Aspects 1-15.

Aspect 28: An apparatus for wireless communication, comprising at least one means for performing the method of one or more of Aspects 1-15.

Aspect 29: A non-transitory computer-readable medium storing code for wireless communication, the code comprising instructions executable by a processor to perform the method of one or more of Aspects 1-15.

Aspect 30: A non-transitory computer-readable medium storing a set of instructions for wireless communication, the set of instructions comprising one or more instructions that, when executed by one or more processors of a device, cause the device to perform the method of one or more of Aspects 1-15.

Aspect 31: An apparatus for wireless communication at a device, comprising a processor; memory coupled with the processor; and instructions stored in the memory and executable by the processor to cause the apparatus to perform the method of one or more of Aspects 16-25.

Aspect 32: A device for wireless communication, comprising a memory and one or more processors coupled to the memory, the one or more processors configured to perform the method of one or more of Aspects 16-25.

Aspect 33: An apparatus for wireless communication, comprising at least one means for performing the method of one or more of Aspects 16-25.

Aspect 34: A non-transitory computer-readable medium storing code for wireless communication, the code comprising instructions executable by a processor to perform the method of one or more of Aspects 16-25.

Aspect 35: A non-transitory computer-readable medium storing a set of instructions for wireless communication, the set of instructions comprising one or more instructions that, when executed by one or more processors of a device, cause the device to perform the method of one or more of Aspects 16-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a network entity, a configuration that indicates one or more measurement objects, wherein a measurement object of the one or more measurement objects indicates a synchronization signal block (SSB) frequency of a configured bandwidth part (BWP);
      determine, from the one or more measurement objects, a serving cell measurement object based at least in part on an active BWP of the UE, wherein the serving cell measurement object is associated with an SSB frequency in the active BWP, and wherein the active BWP of the UE is a first BWP;
      perform a BWP switching, from the first BWP to a second BWP, associated with the first BWP becoming inactive and the second BWP becoming active; and
      determine, based at least in part on the BWP switching, whether a reference SSB of a neighbor cell becomes an intra-frequency SSB or an inter-frequency SSB.

2. The apparatus of claim 1,
   wherein the SSB frequency associated with the measurement object, of the one or more measurement objects, is a non-cell-defining SSB frequency of the configured BWP or a cell-defining SSB frequency of the configured BWP.

3. The apparatus of claim 1,
   wherein the one or more processors are further configured to:
      autonomously determine, from the one or more measurement objects and based at least in part on the BWP switching, an updated serving cell measurement object based at least in part on the second BWP, wherein the updated serving cell measurement object is associated with an SSB frequency in the second BWP.

4. The apparatus of claim 1,
   wherein the one or more processors are configured to perform the BWP switching based at least in part on signaling from the network entity.

5. The apparatus of claim 1,
   wherein the one or more processors are configured to perform the BWP switching based at least in part on an expiration of a timer.

6. The apparatus of claim 1,
   wherein the one or more processors are further configured to:
      receive, from the network entity and based at least in part on the BWP switching, signaling that instructs the UE to determine, from the one or more measurement objects, an updated serving cell measurement object based at least in part on the second BWP.

7. The apparatus of claim 1,
   wherein the one or more processors are further configured to:
      determine, from the one or more measurement objects, an updated serving cell measurement object in accordance with a time duration that is different than a BWP switching delay.

8. The apparatus of claim 1,
   wherein the one or more processors are further configured to:
      identify and measure the reference SSB of the neighbor cell within a time period, wherein the time period is based at least in part on whether the reference SSB of the neighbor cell is the intra-frequency SSB or the inter-frequency SSB.

9. The apparatus of claim 8,
   where a time period to identify and measure the inter-frequency SSB is greater than a time period to identify and measure the intra-frequency SSB.

10. The apparatus of claim 1,
    wherein the one or more processors are further configured to:
       determine, based at least in part on a BWP switching, whitelisted cells associated with the serving cell measurement object.

11. The apparatus of claim 1,
    wherein the active BWP excludes a non-cell-defining SSB, and a cell-defining SSB is associated with the serving cell measurement object.

12. The apparatus of claim 1,
    wherein the UE is a reduced capability UE.

13. An apparatus for wireless communication at a network entity, comprising:
    one or more memories; and
    one or more processors, coupled to the one or more memories, configured to:
       transmit, to a user equipment (UE), a configuration that indicates one or more measurement objects,
          wherein a measurement object of the one or more measurement objects indicates a synchronization signal block (SSB) frequency in a configured bandwidth part (BWP),
          wherein a serving cell measurement object from the one or more measurement objects is based at least in part on an active BWP of the UE, wherein the active BWP is a first BWP, and
          wherein configuration is associated with:
             a BWP switching, by the UE from the first BWP to a second BWP, for the first BWP to become inactive and the second BWP to become active, and
             a determination, by the UE and based at least in part on the BWP switching, whether a reference SSB of a neighbor cell becomes an intra-frequency SSB or an inter-frequency SSB.

14. The apparatus of claim 13,
    wherein the serving cell measurement object is associated with an SSB frequency in the active BWP.

15. The apparatus of claim 13,
wherein the SSB frequency associated with the measurement object, of the one or more measurement objects, is a non-cell-defining SSB frequency of the configured BWP or a cell-defining SSB frequency of the configured BWP.

16. The apparatus of claim 13,
wherein the one or more processors are further configured to:
  transmit, to the UE and based at least in part on the BWP switching, signaling that instructs the UE to determine, from the one or more measurement objects, an updated serving cell measurement object based at least in part on the second BWP.

17. The apparatus of claim 13,
wherein the BWP switching is based at least in part on signaling from the network entity or an expiration of a timer.

18. The apparatus of claim 13,
wherein the active BWP excludes a non-cell-defining SSB, and a cell-defining SSB is associated with the serving cell measurement object.

19. The apparatus of claim 13,
wherein the one or more processors are further configured to:
  determine, based at least in part on the BWP switching, whether the reference SSB of the neighbor cell becomes the intra-frequency SSB or the inter-frequency SSB; and
  transmit, to the UE, an indication of whether the reference SSB of the neighbor cell becomes the intra-frequency SSB or the inter-frequency SSB.

20. The apparatus of claim 13,
wherein the one or more processors are further configured to:
  determine, based at least in part on the BWP switching, whitelisted cells associated with the serving cell measurement object; and
  transmit, to the UE, an indication of the whitelisted cells associated with the serving cell measurement object.

21. The apparatus of claim 13,
wherein the UE is a reduced capability UE.

22. A method of wireless communication performed by a user equipment (UE), comprising:
  receiving, from a network entity, a configuration that indicates one or more measurement objects, wherein a measurement object of the one or more measurement objects indicates a synchronization signal block (SSB) frequency of a configured bandwidth part (BWP); and
  determining, from the one or more measurement objects, a serving cell measurement object based at least in part on an active BWP of the UE, wherein the serving cell measurement object is associated with an SSB frequency in the active BWP, and wherein the active BWP of the UE is a first BWP;
  performing a BWP switching from the first BWP to a second BWP, wherein the first BWP becomes inactive and the second BWP becomes active based at least in part on the BWP switching; and
  determining, based at least in part on the BWP switching, whether a reference SSB of a neighbor cell becomes an intra-frequency SSB or an inter-frequency SSB.

23. The method of claim 22,
wherein the SSB frequency associated with the measurement object, of the one or more measurement objects, is a non-cell-defining SSB frequency of the configured BWP or a cell-defining SSB frequency of the configured BWP.

24. The method of claim 22, further comprising:
  autonomously determining, from the one or more measurement objects and based at least in part on the BWP switching, an updated serving cell measurement object based at least in part on the second BWP, wherein the updated serving cell measurement object is associated with an SSB frequency in the second BWP.

25. A method of wireless communication performed by a network entity, comprising:
  transmitting, to a user equipment (UE), a configuration that indicates one or more measurement objects,
    wherein a measurement object of the one or more measurement objects indicates a synchronization signal block (SSB) frequency in a configured bandwidth part (BWP),
    wherein a serving cell measurement object from the one or more measurement objects is based at least in part on an active BWP of the UE, wherein the active BWP is a first BWP, and
    wherein configuration is associated with:
      a BWP switching, by the UE from the first BWP to a second BWP, for the first BWP to become inactive and the second BWP to become active, and
      a determination, by the UE and based at least in part on the BWP switching, whether a reference SSB of a neighbor cell becomes an intra-frequency SSB or an inter-frequency SSB.

26. The method of claim 25,
wherein the serving cell measurement object is associated with an SSB frequency in the active BWP.

27. The method of claim 25,
wherein the SSB frequency associated with the measurement object, of the one or more measurement objects, is a non-cell-defining SSB frequency of the configured BWP or a cell-defining SSB frequency of the configured BWP.

28. The method of claim 25,
further comprising:
  transmitting, to the UE and based at least in part on the BWP switching, signaling that instructs the UE to determine, from the one or more measurement objects, an updated serving cell measurement object based at least in part on the second BWP.

29. The method of claim 25,
wherein the BWP switching is based at least in part on signaling from the network entity or an expiration of a timer.

* * * * *